US006711462B2

(12) United States Patent
Flores et al.

(10) Patent No.: US 6,711,462 B2
(45) Date of Patent: Mar. 23, 2004

(54) SYSTEM AND METHOD FOR COLLATING ITEMS

(75) Inventors: Juan Esteban Flores, Owasso, OK (US); Francisco Ottoniel Torrealba, Tulsa, OK (US); William Wheeler, Sand Springs, OK (US)

(73) Assignee: Lockheed Martin Corporation, Bethesda, MD (US)

( * ) Notice: Subject to any disclaimer, the term of this patent is extended or adjusted under 35 U.S.C. 154(b) by 50 days.

(21) Appl. No.: 10/092,409

(22) Filed: Mar. 5, 2002

(65) Prior Publication Data

US 2003/0171845 A1 Sep. 11, 2003

(51) Int. Cl.$^{7}$ .................................................. G06F 7/00
(52) U.S. Cl. ........................ 700/223; 700/224; 700/220
(58) Field of Search ................................ 700/220, 221, 700/222, 223, 224

(56) References Cited

U.S. PATENT DOCUMENTS

| | | | | |
|---|---|---|---|---|
| 3,583,545 A | | 6/1971 | Hovekamp et al. | |
| 3,613,863 A | | 10/1971 | Hedrick et al. | |
| 3,941,372 A | | 3/1976 | Matsuo | |
| 4,150,743 A | | 4/1979 | Lazzarotti et al. | |
| 4,184,628 A | | 1/1980 | Schultz | |
| 4,201,332 A | | 5/1980 | Wooten | |
| 4,360,098 A | | 11/1982 | Nordstrom | |
| 4,401,301 A | | 8/1983 | Hayskar | |
| 4,440,492 A | | 4/1984 | Howard | |
| 4,494,646 A | | 1/1985 | Honegger | |
| 4,566,595 A | | 1/1986 | Fustier | |
| 4,566,685 A | | 1/1986 | Irvine et al. | |
| 4,576,370 A | | 3/1986 | Jackson | |
| 4,589,590 A | | 5/1986 | McGuire et al. | |
| 4,641,753 A | | 2/1987 | Tamada | |
| 4,733,359 A | * | 3/1988 | Luperti et al. | 700/220 |
| 4,800,505 A | | 1/1989 | Axelrod et al. | |
| 5,009,321 A | | 4/1991 | Keough | |
| 5,031,223 A | | 7/1991 | Rosenbaum et al. | |
| 5,067,088 A | * | 11/1991 | Schneiderhan | 700/221 |
| 5,074,539 A | | 12/1991 | Wells et al. | |
| 5,133,543 A | | 7/1992 | Eitel et al. | |
| 5,226,547 A | | 7/1993 | Malatesta | |
| 5,321,624 A | * | 6/1994 | Helffrich et al. | 700/222 |
| 5,398,922 A | | 3/1995 | Malatesta | |
| 5,419,587 A | | 5/1995 | McClure et al. | |
| 5,519,624 A | | 5/1996 | Hidding | |
| 5,544,758 A | | 8/1996 | Malatesta | |
| 5,618,037 A | * | 4/1997 | Chang et al. | 271/258.02 |
| 5,673,193 A | | 9/1997 | Brust et al. | |
| 5,726,897 A | | 3/1998 | Tammi et al. | |
| 5,754,434 A | * | 5/1998 | Delfer et al. | 700/223 |
| 5,774,363 A | * | 6/1998 | Sato et al. | 700/97 |
| 5,810,158 A | | 9/1998 | Schiesser et al. | |
| 5,915,523 A | | 6/1999 | Spatafora | |
| 5,950,800 A | | 9/1999 | Terrell et al. | |
| 5,984,078 A | | 11/1999 | Bonnett | |
| 6,217,020 B1 | | 4/2001 | Supron et al. | |
| 6,259,967 B1 | | 7/2001 | Hartlepp et al. | |
| 6,260,841 B1 | | 7/2001 | Tranquilla | |
| 6,270,069 B1 | | 8/2001 | Cera et al. | |
| 6,270,070 B1 | | 8/2001 | Salomon et al. | |

FOREIGN PATENT DOCUMENTS

| | | |
|---|---|---|
| EP | 0 575 109 A1 | 12/1993 |
| WO | WO 98/24564 | 6/1998 |

* cited by examiner

*Primary Examiner*—Gene O. Crawford
(74) *Attorney, Agent, or Firm*—Wolf, Greenfield & Sacks, P.C.

(57) ABSTRACT

A system and method for merge-sequencing ordered subsets of items into a single merged set in a predetermined sorted sequence and error-checking the resulting merged set to provide information about out of order items to allow for efficient error correction methods. The system uses an outcome verifier module to ensure that items placed onto the single merged set are in the proper sequence. Items that are not in the proper sequence are temporarily removed from the merged set. If it is determined that items are missing from the sorted sequence a placeholder may be inserted to mark the place of missing items.

33 Claims, 9 Drawing Sheets

| ITEM EXPECTED | GOT AFTER FEED | EARLIER THAN EXPECTED BIN | LATER THAN EXPECTED BIN | CARD INJECTED |
|---|---|---|---|---|
| 28 | 28 | | | |
| 29 | 29 | | | |
| 30 | 30 | | | |
| 31 | 26 | | 26 | 31 |
| 31 | 27 | | 27 | |
| 31 | 31 | | 31 | |
| 32 | 32 | | | |
| 33 | 33 | | | |
| 34 | 34 | | | |
| | | | | |
| | | | | |
| | | | | |
| | | | | |
| | | | | |

RESYNCHRONIZATION

FIG. 6A

| ITEM EXPECTED | GOT AFTER FEED | EARLIER THAN EXPECTED BIN | LATER THAN EXPECTED BIN | CARD INJECTED |
|---|---|---|---|---|
| 24 | 24 | | | |
| 25 | 31 | 31 | | 25 |
| 26 | 26 | | | |
| 27 | 27 | | | |
| 28 | 28 | | | |
| 29 | 29 | | | |
| 30 | 30 | | | |
| | | | | |
| | | | | |
| | | | | |
| | | | | |
| | | | | |
| | | | | |
| | | | | |

FIG. 6B

SYSTEM AND METHOD FOR COLLATING ITEMS

FIELD OF THE INVENTION

The present invention relates to systems and methods for collating articles, and, more specifically, to systems and methods for collating articles into an ordered set from ordered subsets.

BACKGROUND OF THE INVENTION

There are applications in industry, government and other organizations where a number of items need to be put together into an ordered set from a number of ordered subsets. Such a problem arises, for example, where magazines, newspapers, or other publications are mailed to readers and, in order to comply with post office regulations, the publications must be ordered according to the postal code of addressees. However, the publications might come from different printing presses or different processing apparatuses and cannot be put together into an ordered set simply by combining the subsets, without some additional processing.

One specific example of the need for such a collation apparatus and mechanism is the magazine publishing industry. Current technology allows magazine publishers to customize magazine editions such that different readers might see different versions of the same magazine. For example, a version mailed to a car enthusiast might contain advertisements for cars, while a version of the same magazine mailed to a golf enthusiast might contain advertisements for golfing equipment. While these different versions of the same magazine might be printed on the same press in order of mailing addresses, they frequently have envelopes attached to them that will bear reader-specific information, such as subscription or advertising information. Thus, it is necessary to keep the envelopes ordered in correspondence with the order of the magazines, so that magazines containing reader-specific information may be efficiently attached to envelopes containing corresponding reader-specific information. Although "intelligent inserting machines" exist which allow envelopes to be stuffed in original list order with reader-specific content, these machines are typically much larger, much more expensive, and far less efficient than "non-intelligent" inserting machines. Therefore, for greater efficiency, the envelopes are often separated into subsets, based on the material that will be stuffed into the envelopes, and are stuffed separately in "non-intelligent" inserting machines. After all the envelopes in each subset are stuffed, the subsets must be collated into a single set, with the order of this set matching that of the order of the magazines, so that the envelopes can then be attached to the magazines. Each subset will be sorted internally, but in order to put them together, they must be additionally collated, so that the whole set is ordered. Therefore, collation is an important production process.

For the above magazine publishing industry example, it is important that the collation be done efficiently and with minimal errors. The reason for this is that even a single error might result in an offset in the collated set, which could result in subsequent addressees not receiving magazines targeted for them. Such efficiency and error-free operation are also important in applications other than magazine publishing. Current methodologies for collating articles from subsets into an ordered set are often inefficient, sometimes even being done by hand. Therefore, a need exists for a system and method for collating articles in an efficient, one-pass manner, that also minimizes errors and the consequences thereof.

SUMMARY OF THE INVENTION

In one aspect of the invention, a method is provided for collating items into at least one ordered group from at least two subgroups, using a processor, modules for supplying items and a mechanism for transporting items to an output destination. The method includes the steps of a) arranging the at least two subgroups such that items are in order within each of the at least two subgroups, b) placing each of the at least two subgroups into corresponding modules for supplying the items, c) controlling a module for a subgroup containing an item of a first ordered group to be supplied to supply the item at a given time to the mechanism for transporting, d) repeating act c) until all items of the first ordered group are collated, e) checking the order of the items as they are transported to the output destination, and f) performing error correcting routines if an error is detected.

In another aspect of the invention, an apparatus is provided for collating items into at least one ordered group from at least two subgroups. The apparatus comprises a mechanism for transporting the items to an output destination, at least two modules containing corresponding subgroups for supplying items to the mechanism for transporting the items in response to supply instructions, a processor for determining the at least one item to be supplied at a given time and generating instructions for said module to supply the at least one item, a mechanism for checking the order of items as they are transported to the output destination, and a mechanism for correcting an error detected in the order of items as they are transported to the output destination.

BRIEF DESCRIPTION OF THE DRAWINGS

Reference will now be made to the accompanying drawings, showing by way of illustration, a preferred embodiment thereof, and in which:

FIGS. 6A–6B are charts illustrating a method for error handling of the present invention.

DETAILED DESCRIPTION OF THE INVENTION

Figure 1A:
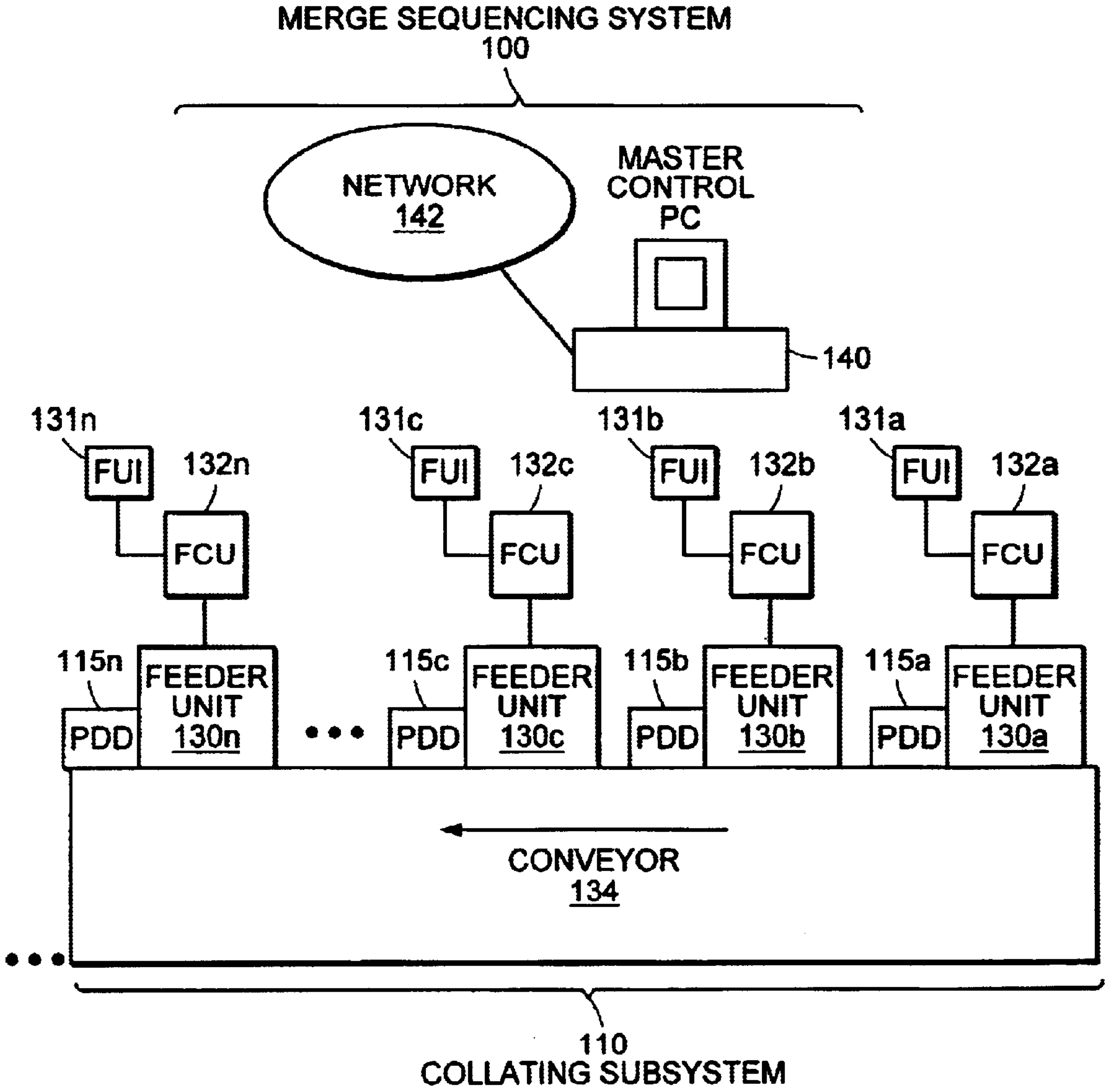
FIG. 1A is a block diagram of the collating subsystem of the merge sequencing system of the present invention.
Figure 1B:
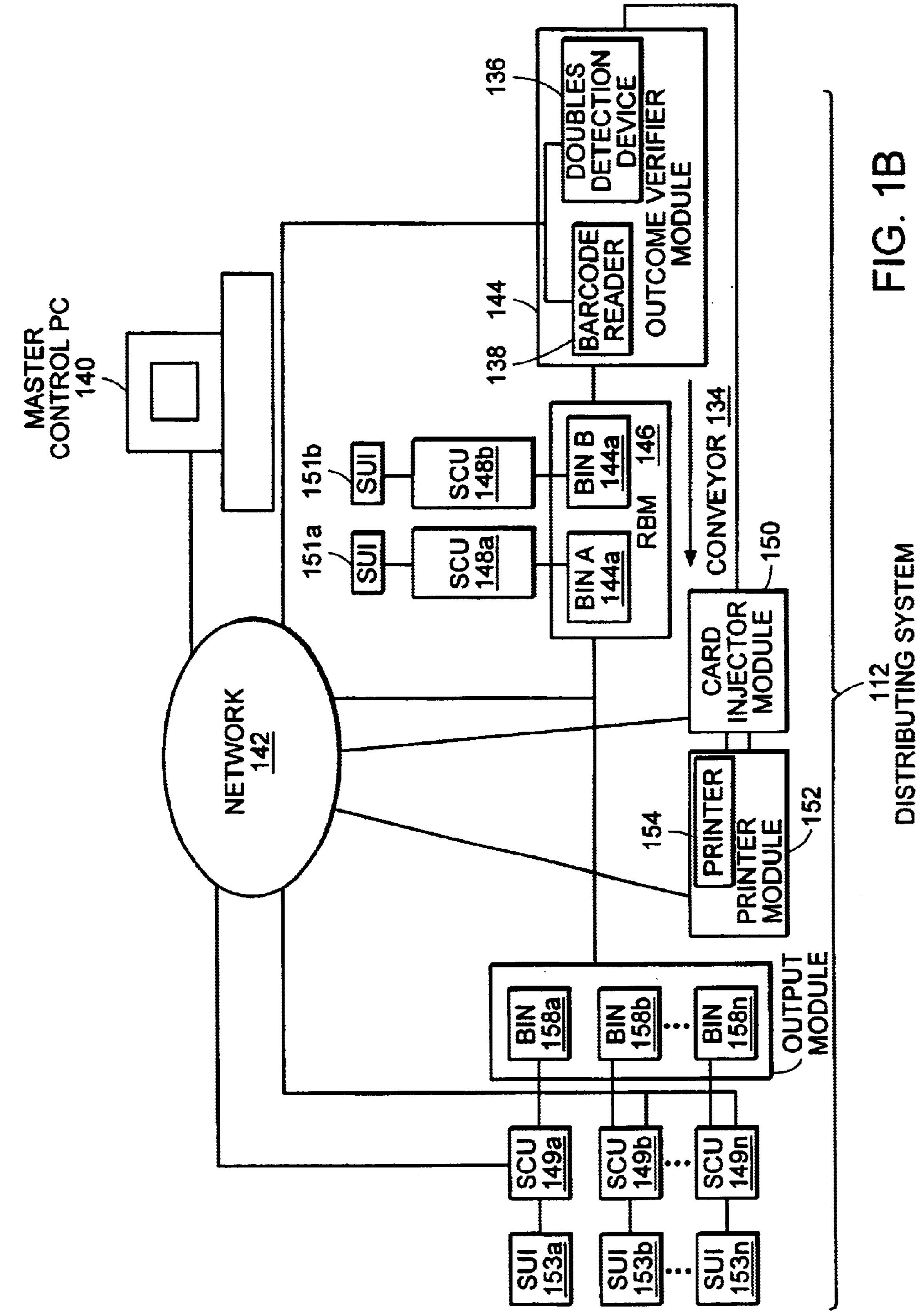
FIG. 1B is a block diagram of the error checking and distributing subsystem of the merge sequencing system of the present invention.

Referring to FIGS. 1A and 1B, an illustrative embodiment of a merge sequencing system 100 of the present invention includes a collating subsystem 110 of FIG. 1A, an error checking and distributing subsystems 112 (FIG. 1B) and a Conveyor 134. Conveyor 134, may be, for example, a horizontal conveyor belt or a vertical conveyor using pinch belts. Collating subsystem 110 includes a number of Feeder Units 130*a*–130*n*, which feed items to Conveyor 134. The collating subsystem 110 further comprises a number of Feeder Control Units (FCU) 132*a*–132*n*, each of which controls a corresponding one of the Feeder Units. Each FCU is interfaced through Network 142 to a Master Control CPU 140, whose functions include receiving real-time input from all modules in the system and directing Feeder Units 132 to feed an item to Conveyor 134. Each FCU 132 also supports its own Feeder User Interface (FUI) 131*a*–131*n* which is used to deliver messages to operators, signal operators when attention is required, and signal its corresponding FCU 132 when an operator has completed a required action. Network 142, which is used to connect all processing units in the merge sequencing system, may be any suitable networking hardware, software, or combination thereof, including, but not limited to, an Ethernet LAN or WAN, a Token-Ring network, or a wireless network. A plurality of Presence Detection Devices 115*a*–115*n* are positioned along Conveyor 134 and are used to detect the presence and position of items on Conveyor 134. The Presence Detection Devices 115*a*–115*n* are also connected to Master Control CPU 140 through Network 142.

Referring to FIG. 1B, in one embodiment, the error checking subsystem of the present invention comprises an Outcome Verifier Module (OVM) 144, a Reject Bin Module (RBM) 146, which is controlled by two Stacker Control Units (SCU) 148*a* and 148*b*, a Card Injector Module 150, a Printer Module 152, and an Output Module 156. The OVM 144 further comprises a Barcode Reader 138 and a Doubles Detection Device 136 and is located on Conveyor 134 past the array of Feeder Units 130. Barcode Reader 138 and Doubles Detection Device 136 both send data to and receive data from Master Control CPU 140 through Network 142. RBM 146, located on the conveyor after OVM 144, comprises two reject bins 144*a* and 144*b*. SCUs 148*a* and 148*b*, which connect to the Master Control CPU 140 through Network 142, control which items are routed into reject bins 144*a* and 144*b*, as directed by Master Control CPU 140. Stacker User Interfaces (SUI) 151*a* and 151*b* display information pertinent to SCUs 148*a* and 148*b* to an operator and allow the operator to communicate with SCUs 148*a* and 148*b*. Reject bin 144*a* receives items that arrive on Conveyor 134 before they were expected, while reject bin 144*b* receives items that arrive on Conveyor 134 after they were expected. The Card Injector Module 150 is located on Conveyor 134 after RBM 146. Printer Module 152 is located on Conveyor 134 after Card Injector Module 150. Output Module 156 comprises a number of output bins 158*a*–158*n* and is located on Conveyor 134 immediately after the Printer Module 152. The number of bins in Output Module 156 is determined by a number of factors including the capacity of each bin and the total number of items which are being collated. Similar to the RBM 146, SCUs 149*a*–149*n* connect to the Master Control CPU 140 through Network 142, and control which items are routed into output bins 158*a*–158*n*. SUIs 153*a*–153*n* allow for operator interaction with SCUs 149.

FIGS. 2A–2D illustrate how records from a large master list are grouped and divided into smaller sublists and then collated into a single large list in the same order as the original master list.

Figure 2A:
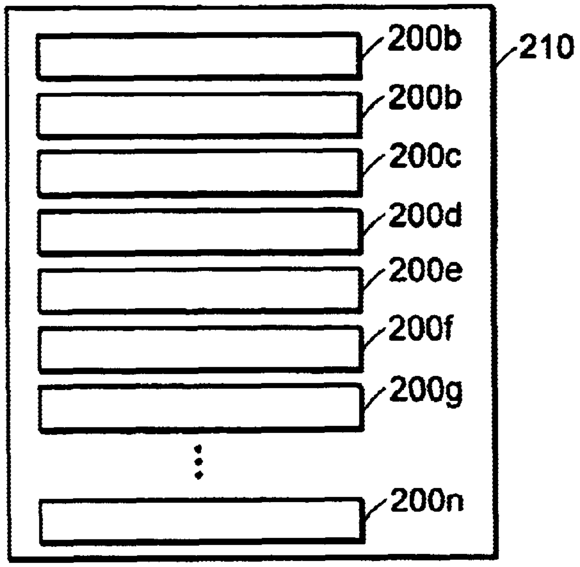
FIG. 2A is a representation of an illustrative computer record file usable in the present invention.

Referring to FIG. 2A, in one embodiment, a master list 210 can be an electronic representation or computer file made up of a large number of records 200*a*–200*n*. Master list 210 may be located in primary memory, secondary memory, or on any suitable backup media. Furthermore, the records of master list 210 may be stored sequentially in memory, or non-sequentially, such as in a database management system. For the embodiment described, master list 210 may be a list of subscribers to a particular magazine, where each record 200 of master list 210 contains information about a subscriber, such as name, address, telephone number, and an indication of specific content for that subscriber. Each record 200 may also contain a group number, which is independent of any other information in the record and independent of the ordinal position of the record in the file. This group number may be used to determine in which sublist a particular record belongs.

Figure 2B:
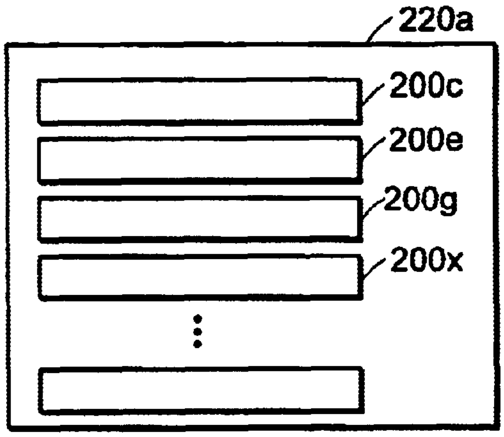
FIGS. 2B–2D are representations of the computer record file of FIG. 2A divided into record sub-files.
Figure 2C:
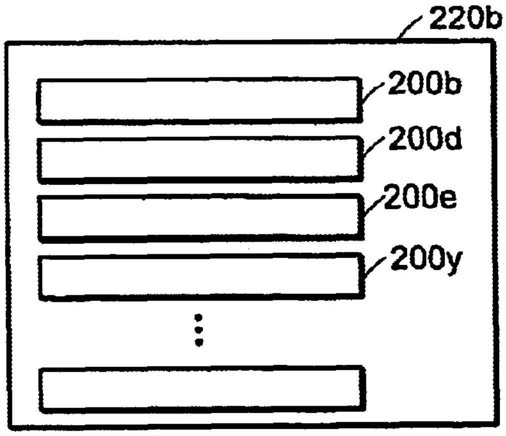
Figure 2D:
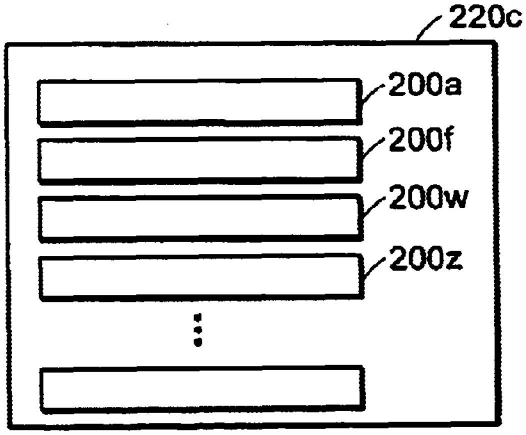

FIGS. 2B–2D illustrate sublists of master list 210. Each sublist contains some number of records 200 from master list 210. The records comprising each sublist are in an order corresponding to their original position in master list 210, but with all the records belonging to other sublists removed. For example, illustrative sublist 220*a*, shown in FIG. 2B, includes records 200*c*, 200*e*, and 200*g*. Since record 200*c* preceded record 200*e* in the master list 210, 200*c* also precedes 200*e* in sublist 220*a*. FIGS. 2C and 2D show illustrative sublists 220*b* and 220*c* respectively, the same relationships holding true for all records in all sublists. Subgroups are created by subdividing items according to records in the sublists.

Figure 3:
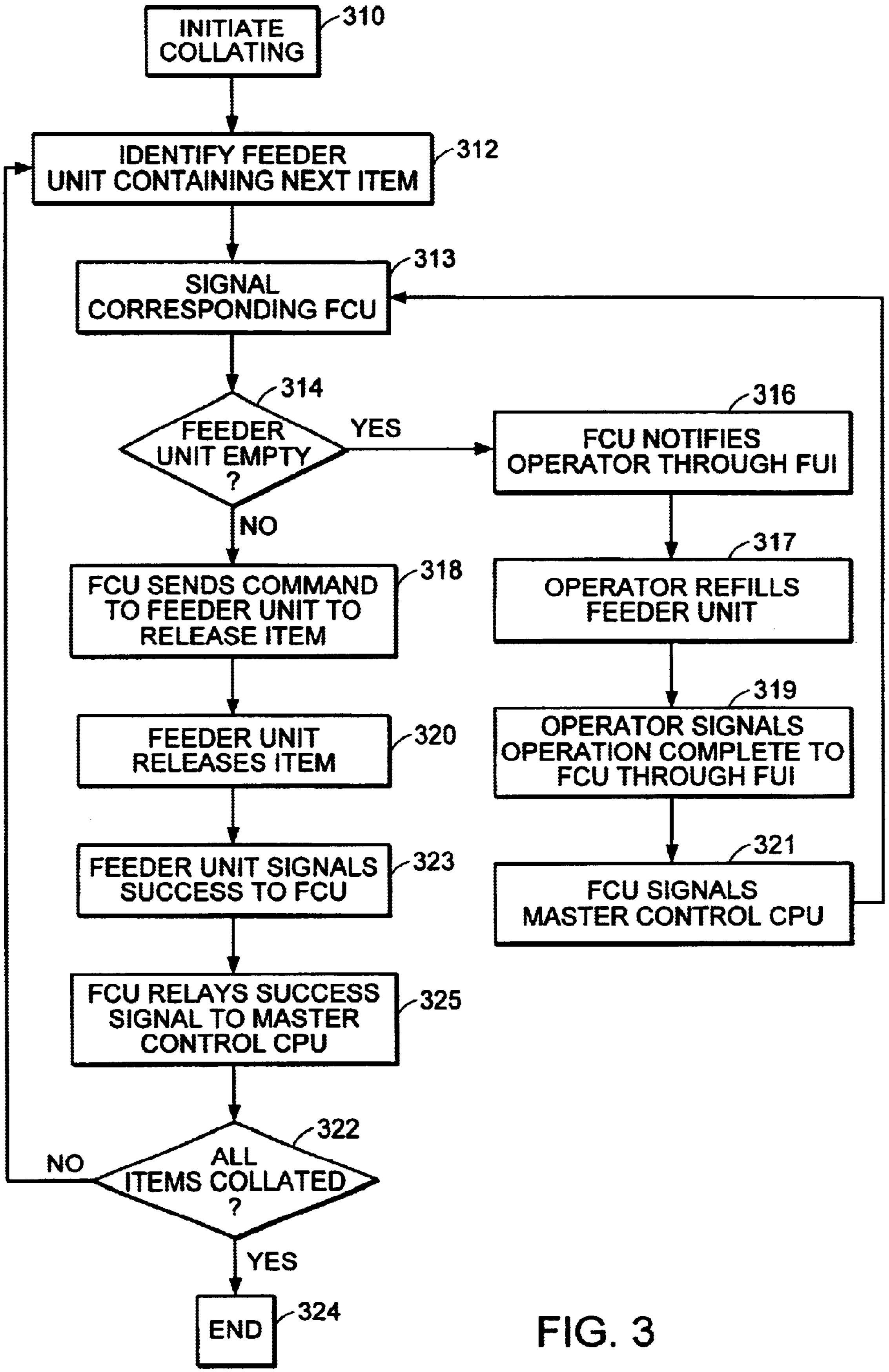
FIG. 3 is a flow chart illustrating a method by which items are collated in the merge sequencing system of the present invention.

FIG. 3 is a flow diagram of the process by which items, such as those contained in sublists 220*a*, 220*b* and 220*c* are collated into the order specified by master list 210. In one embodiment, one Feeder Unit 130 is required for each sublist 220 that will be merged. As mentioned above, each Feeder Unit 130 is controlled by a corresponding FCU 132 which in turn is controlled by Master Control CPU 140. For the embodiment shown, collating is initiated at step 310. At step 312, the Master Control CPU 140 determines which Feeder Unit 130 contains the next item to be collated by using master list 210. At step 313, Master Control CPU 140 signals the appropriate FCU 132 to feed the next item in its corresponding Feeder Unit 130 to Conveyor 134. Master Control CPU 140 may signal each FCU 132 individually or may signal several or all of the FCUs 132 simultaneously. At step 314, the FCU 132 for the selected Feeder Unit 130 determines if Feeder Unit 130 is empty. At step 316, If the Feeder Unit 130 is empty, the corresponding FCU 132 notifies an operator through its corresponding FUI 131 and further notifies Master Control CPU 140 to suspend the collating process until further notice. At step 317, the operator refills the appropriate Feeder Unit 130 and at step 319 uses the FUI 131 to signal to the FCU 132 that the operation is complete. At step 321, FCU 132 signals Master Control CPU 140 to continue the collating process. The process returns to step 313. Since the appropriate Feeder Unit 130 is no longer empty, the process continues to step 318. At step 318, FCU 132 then signals Feeder Unit 130 to feed the next item to Conveyor 134. Feeder Units 130 may be refilled manually, automatically, or a combination thereof. If the Feeder Units 130 are automatically refilled, the refilling may be done when each Feeder Unit reaches a selected level of fullness, for example half full or a third full, so that steps 314–321 are not required. Step 316 may also be performed when the Feeder Unit reaches a selected level of fullness rather than when empty, so the operator may prevent the need to stop the systems by refilling Feeder Units periodically as required. At step 314, if FCU 132 determines that Feeder Unit 130 is not empty, then the process proceeds to step 318 where FCU 132 signals Feeder Unit 130 to feed the next item to Conveyor 134. At step 320, Feeder Unit 130 feeds its next item to Conveyor 134. At step 323, when the item is successfully fed to Conveyor 134, the Feeder Unit 130 signals a successful load to the FCU 132, which, at step 325, relays this information to Master Control CPU 140.

Master Control CPU 140 uses tracking means so that it can release items at the appropriate time. For example, suppose Feeder Unit 130*a* contains the first item to be released and Feeder Unit 130*b* contains the second item to be released. Master Control CPU 140 must ensure that the item released from Feeder Unit 130*a* passes Feeder Unit 130*c* before the second item is released from Feeder Unit 130*c* so that the items will reach the output bins 158 in the correct order. One form of tracking means that Master Control CPU 140 may use is its knowledge of the speed of the conveyor and the distance between each Feeder Unit to calculate at what time it can release the second item from Feeder Unit 130*c*. Another form of tracking means is Presence Detection Devices 115*a*–115*n*. Each Presence Detection Device 115 can detect when an item passes it and may relay this information to Master Control CPU 140 so that Master Control CPU 140 may determine the position of the item on Conveyor 134. A Presence Detection Device may, be for example, a photoelectric cell, either of the reflective type or emitter/receiver type, a microswitch, or a sonar device. It should be understood that the present invention is not limited to any particular type of Presence Detection Device and any suitable type of Presence Detection Devices may be used. As shown in FIG. 1A, a Presence Detection Device 115 may by located directly next to a Feeder Unit 130 to detect when the Feeder Unit 130 releases an item. It is also possible to place Presence Detection Devices throughout the conveyor to determine the location of an item at each stage of the process. For example, a Presence Detection Device may be placed next to Outcome Verifier Module 144, Reject Bin Module 146, and Output Module 156. One embodiment of the configuration and use of Presence Detection Devices in this type of system is described in detail in U.S. patent application Ser. No. 09/907,919, titled "Object and Method for Accessing of Articles for Reliable Knowledge of Article Positions", filed on Jul. 19, 2001, which is hereby incorporated by reference in its entirety. Additionally, Master Control CPU 140 can use tracking means to further increase efficiency. For example, suppose Feeder Unit 130*c* contains the first, second, and fourth items in the master list and Feeder Unit 130*a* contains the third item in the master list. If the Master Control CPU 140 instructed Feeder Unit 130*c* to feed the first item and second item to Conveyor 134 and then instructed Feeder Unit 130*a* to feed the third item from Feeder Unit 130*a*, then it would have to wait for the third item to travel down the conveyor past Feeder Unit 130*c* before it could instruct Feeder Unit 130*c* to release the fourth item. However, since Master Control CPU 140 knows the speed of the conveyor and the position of items, it can instruct Feeder Unit 130*a* to release the third item at a particular time so that it will reach Feeder Unit 130*c* just after Feeder Unit 130*c* has fed the second item to Conveyor 134. Thus, Master Control CPU 140 will not have to wait for the third item to travel down the conveyor in order to continue the collating process. This feature becomes increasingly desirable as the number of Feeder Units 130 increases. At step 322, Master Control CPU 140 determines if all items have been collated. If all items have been collated the process continues to step 324 where the collating process ends. Otherwise, the process returns to step 312, where Master Control CPU 140 determines which Feeder Unit 130 contains the next item to be collated. This process repeats itself until a "yes" output is obtained at step 322.

In another illustrative embodiment, the process illustrated by FIG. 3 may be modified so that the system is capable of collating items from two separate master lists. This may be accomplished, for example, by appending the second master list to the first master list and using these two combined master lists in place of master list 210.

FIG. 4 is a flow chart of an illustrative error checking subroutine of the present invention. In one embodiment, items examined in the error checking subroutine are marked with indicia which may, for example, identify the ordinal position of items in the file or contain other information about a particular item. The indicia may be machine-readable. In the embodiment shown in the drawings the indicia are barcodes, however, any machine-readable identifier may be used. For example, the indicia may be magnetic ink or a radio tag. The indicia may also be, for example, text recognizable by an optical character recognition device or a image recognizable by a video image recognition device. At step 410 the error checking process begins. At step 412 Doubles Detection Device 136 determines if two items are stacked on each other or beside each other, such that one item obscures the reading or detection of another item. This may be caused by, for example, a malfunctioning Feeder Unit feeding two items at once to Conveyor 134. Doubles Detection Device 136 may be any type of device capable of determining whether items are stacked on top of each other or beside each other. The type of Doubles Detection Device used may depend on the size and material of the items. The Doubles Detection Device 136 may be, for example, a camera which optically determines whether two items are stacked on top of each other or beside each other, a device which measures the capacitance of items, a device which measure the opacity of items by directing light at the items, or a device that measures thickness of items. It should be understood that the Doubles Detection Device 136 is not limited to any particular type of device, and any suitable device for detecting doubles may be used. At step 415, if this condition exists, the bar code of the top item is scanned. If the top item is out of order, but is earlier than expected, both items are routed to Reject Bin 144*a*. If the top item is out of order, but is later than expected, both items are routed to Reject Bin 144*b*. If the top item is in its appropriate order, that is if it is the item that Master Control CPU 140 was expecting, both are items are still routed to Reject Bin 144*a*, however a marker or placeholder indicating a missing item is injected to Conveyor 134 to indicate the correct position of the missing top item. The placeholder is then routed to Output Module 156 and stacked in its appropriate bin, in place of the missing top item. The use of markers and placeholders will be discussed below in more detail. If Doubles Detection Device 136 determines that this condition does not exist, the Barcode Reader 138 reads information from the barcode on the item at step 414, and relays this information to Master Control CPU 140. In an instance where types of indicia other than barcodes are used to identify items, Barcode Reader 138 could be replaced or used in conjunction with other types of readers capable of reading other types of indicia from the items. These other types of readers could also relay information to and receive information from Master Control CPU 140 through Network 142. Master Control CPU 140 uses this information to determine if the item is the correct next item by comparing it with the expected next item in master list 210. At step 422, if the item is the correct next item, it is routed to Output Module 156, where at step 426 it is stacked in the proper bin.

The operation of the Output Module 156 will be discussed below in more detail.

If Master Control CPU 140 has determined that the item was not the expected item, Master Control CPU 140 determines, at step 421, whether the item arrived earlier than it was expected or later than it was expected. If the item arrives earlier than expected, then Master Control CPU 140 determines that the expected items was skipped and proceeds to step 425. As discussed above, markers or placeholders can be used to indicate the position of items routed to Reject Bin Module 146. One possible type of placeholder is card containing information about the missing item. Thus, at step 425, Master Control CPU instructs Card Injector Module 150 to release a card to Conveyor 134 and simultaneously sends information regarding the missing item to Printer Module 152. The injection of the card to Conveyor 134 and the printing of information on the card will be described below in more detail. As shown at step 429, the item itself is routed to Reject Bin 144*a*, which contains items that arrived earlier than expected. Master Control CPU 140 then waits for the next item in the sequence. For example, as illustrated in FIG. 6A, if the Master Control CPU expects the twenty-fifth item in master list 210, but instead receives the thirty-first item, then it has received the thirty-first item earlier than expected. Thus, a card is injected to the conveyor to mark the place of the twenty-fifth item, and the thirty-first item is routed to Reject Bin 144*a*. The, Master Control CPU 140 waits for the twenty-sixth item in master list 210.

As shown in steps 423–431, if Master Control CPU 140 determines that the item arrived later than expected, the item is routed to Reject Bin 144*b* and a card is injected to Conveyor 134 to mark the place of the expected item. Since the item arrived later than expected, Master Control CPU 140 will enter a resynchronization mode and continue to wait for the expected item until resynchronization occurs. For example, as illustrated in FIG. 6B, Master Control CPU expects the thirty-first item in master list 210, instead it the twenty-sixth item arrives. Thus, the item arrived later than expected. Master Control CPU then injects a card to mark the place of the thirty-first item. Master Control CPU 140 will then route the twenty-sixth item to reject bin 144*b* and continue to wait for the thirty-first item, unless it has already determined that the thirty-first item arrived previously, and was routed to Reject Bin 144*a*.

Providing two reject bins, one for items arriving earlier than expected and one for items arriving later than expected, allows for the minimization of errors. For example, if one of the Feeder Units malfunctions and starts feeding all of its items at once, most of these items will end up in the reject bin for earlier than expected items. An operator may then pause operation of the system, and after fixing the malfunctioning Feeder Unit, may reload the items from the earlier than expected reject bin into the appropriate Feeder Units and restart the system. This would be much more difficult if the items were mixed in with other items from the later than expected reject bin. If the items from the later than expected reject bin were reloaded into the appropriate Feeder Units they would still be routed to that bin, because they will still be later than expected.

The card will be larger than the size of the items in at least on dimension so that it is conspicuous in the stack of items. Other features of the card such as color, shape, or texture may also be varied to make the card readily visible in a stack of other items. At step 430, Master Control CPU 140 instructs Printer Module 152 to print the sent information regarding the missing item onto the card. This information may include the ordinal position of the item in master file 210 and information identifying the missing item. This information may be printed in both human readable and barcode formats. Alternatively, the card may be printed before it is injected to Conveyor 134. For example, one could combine Printer Module 152 and Card Injector Module 150 so that a card is first printed by Printer Module 152 and then injected to Conveyor 134 by Card Injector Module 150. After Printer Module 152 has finished printing the card, at step 422 the card is routed to the Output Module 156, where at step 426, it is stacked in the appropriate bin with the rest of the items to mark the place of the missing item. At step 432, Master Control CPU 140 determines if there are any more items left to be checked. If there are no more items, at step 434 the subroutine ends. If there are more items, the subroutine returns to step 412. The subroutine repeats until a "no" output is obtained at step 432. When the subroutine outputs "no" at step 432, all items are in the exact correct order specified by master list 210, except for defects which are marked by marker cards.

Figure 4A:
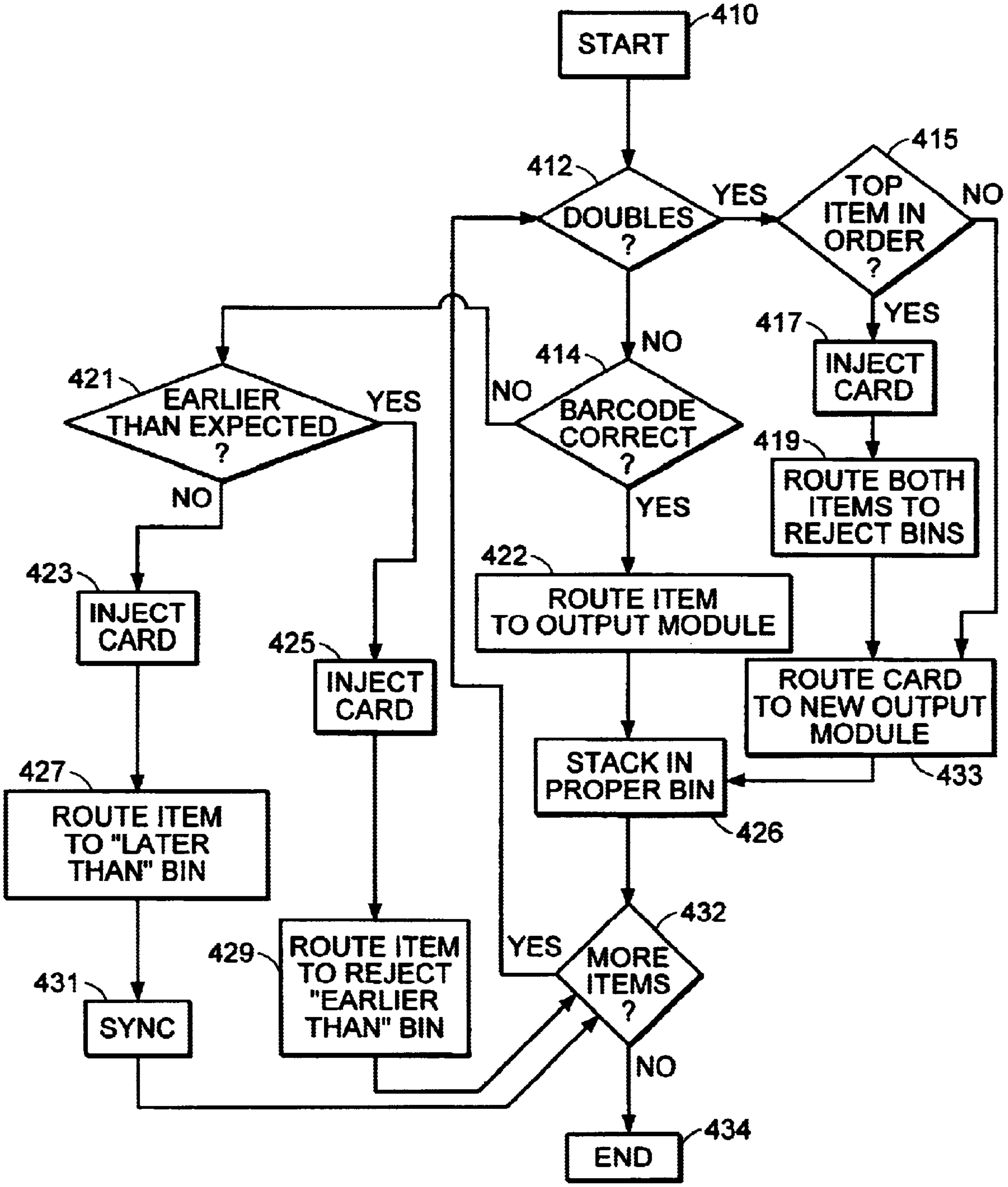
FIG. 4A is a flow chart illustrating an error checking method for the merge sequencing system of the present invention.

It should be understood that the algorithm illustrated in FIG. 4A may easily be modified to suit particular circumstances. Master Control CPU 140 knows which Feeder Unit each item should be fed from and which items were deemed missing during the process. Master Control CPU 140 also knows for which items cards have been injected, which items were sent to reject bins, and which reject bin each item was sent to. Since Master Control CPU 140 has this information, the algorithm may easily be adjusted. The algorithm could be customized, for example, based on the physical and logical characteristics of the items, the characteristics of the equipment being used, or the operational methods of people operating the equipment. For example, if it is known that a particular Feeder Unit is defective and often fails to feed items to Conveyor 134 when instructed, the algorithm may be adjusted to compensate for this faulty Feeder Unit. Many other modifications to the algorithm will occur readily to one of ordinary skill in the art and are intended to be within the spirit and scope of the invention.

In one embodiment of the present invention, Output Module 156 functions as follows. Before the collating process begins, the capacity of each bin is determined. The capacity of the bin is dependent on the size of each bin and on the size and thickness of each item. The number of output bins is also determined prior to collating. Thus, Master Control CPU 140 knows exactly in which bin each item belongs. For example, if there were four bins, each with a capacity of 300 items, and there were 2400 mail items to be sorted, bin 1 would contain items 1–300, bin 2 would contain items 301–600, bin 3 would contain items 601–900, etc. Once these bins are full they must be emptied or replaced with empty bins to make room for items 1201–2400. Alternatively, bins can contain items based on where the items will be mailed. For example, suppose master list 210 is sorted by a zipcode to which the items in master list 210 will be mailed. It might be convenient for bins to contain items that will be mailed to the same place. Thus, for example, if bin 1 is filled with items 1–298 going to zipcode 90210, but item 299 is to be mailed to zipcode 35223 then Master Control CPU 140 can route item 299 to bin 2 and signal the SCU corresponding to bin 1 that bin 1 is full. In another example, suppose that items 1–302 are going to zipcode 90210 and items 303–600 are going to zipcode 35223. Once bin 1 is filled with items 1–300, Master Control CPU 140 may route items 301 and 302 into bin 1 so that is filled beyond its capacity. Alternatively, Master Control CPU 140 may route items 301 and 302 into bin 2 and items 303–600 into bin 3, or Master Control CPU 140 may route items 300–600 so that some items going to zipcode 90210 and some items going to zipcode 35223 are in the same bin.

Figure 4B:
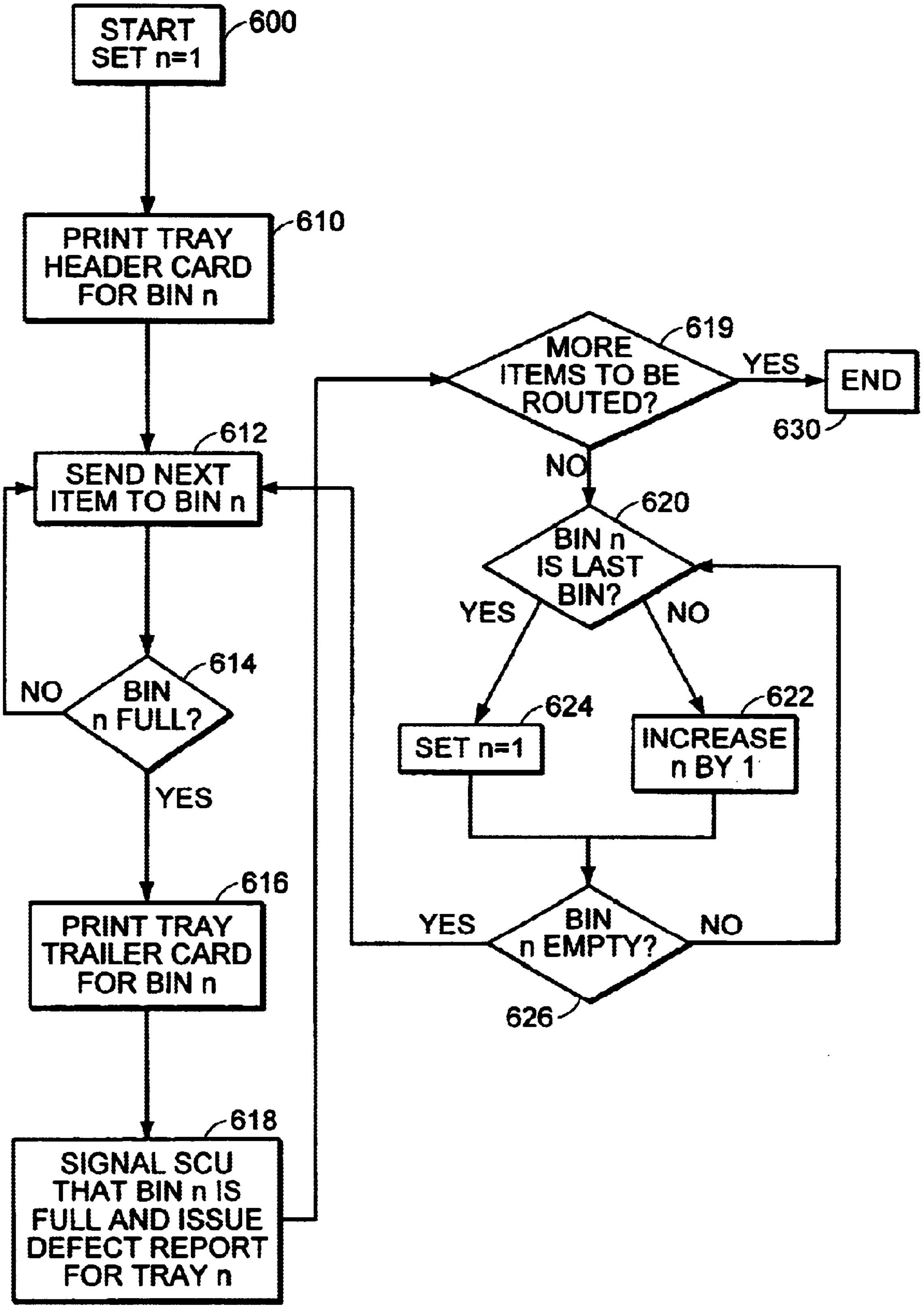
FIG. 4B is a flow chart illustrating a method for routing items to output bins for the merge sequencing system of the present invention.

For an illustrative embodiment shown in FIG. 4B, items are routed to output bins as follows. At step 600 the Master Control CPU keeps track of the current bin, that is the bin to which items are currently being routed. For example, the value of a variable n might represent which bin is the current bin. For example, if the value of n were 2, then the current bin would be bin 2. Before the process of routing items begins, the variable n is set to 1 to indicate that bin 1 is the current bin. At step 610, just prior to instructing a Feeder Unit 130 to feed the first piece, Master Control CPU 140 instructs Card Injector Module 150 to release a card to Conveyor 134 and instructs Printer Module 152 to mark the card as a tray header card. The Printer Module 152 may print information on the tray header card in both human-readable and barcode formats. This information may include the phrase "tray header card", the tray number, and the number of the first piece that will be routed into that tray. Master Control CPU 140 then begins the collating process. At step 612 the Master Control CPU 140 routes each item to the current bin n until it determines that bin n is full (614). Master Control CPU 140 may determine that a bin is full, for example, based on the number of items in the bin, information, such as zipcode, about the addressee of the items in the bin, or whether any more items remain to be placed in output bins. At step 616, before instructing the next item to be fed, Master Control CPU 140 instructs Card Injector Module 150 to feed a tray trailer card to Conveyor 134 and instructs Printer Module 152 to print information on the tray trailer card in both human-readable and barcode formats. This information may include the phrase "tray trailer card", the tray number, and the number of the last piece routed into that tray. At step 618, the Master Control CPU sends a message to the current bin's SCU 149, which then informs the operator using its corresponding SUI 153. Master Control CPU 140 then issues a defect report for the bin that has just been filled. The defect report may contain information regarding which items are missing and may be used by an operator during the defect resolution process. A bin consists of one more trays into which the items are loaded. When an operator sees via SUI 153 that a bin is full, the operator may then empty the trays of the bin into other empty trays or replace the trays in the bin with empty trays. The operator may then signal SCU 149 that the operation is complete through SUI 153. SCU 149 then passes this information back to Master Control CPU 140. This operation may be performed manually, automatically, or semi-automatically. For example, the system may include a robotic tray service or mechanical conveyors that detect when trays or full and empty or replace them accordingly. Alternatively, instead of automatically detecting when trays or full, a human operator could signal, by pushing a button, when a tray is full, thus enabling the robotic tray service or mechanical conveyors to replace or empty the full tray. At step 619 the Master Control CPU determines if there are any more items that must be routed. If there are no more items to be routed the process ends. In steps 620-626, since the current bin is determined to be full, Master Control CPU determines which bin will be the next current bin. At step 620, Master Control CPU 140 checks to see if the current bin is the last bin. For example, if there are four bins and the current bin is bin 4, then the Master Control CPU will proceed to step 624 where n is set to 1 to indicate that bin 1 is the new current bin. If the current bin is not the last bin, Master Control CPU 140 will increase n by one, to indicate that the next bin is the new current bin. Alternatively, Master Control CPU may use a circular counter, wherein when the counter reaches the number of the last bin, it is automatically reset to bin 1. Using this method, the Master Control CPU does not have to check to see if bin n is the last bin. Instead, it can simply increment n. At step 626 the Master Control CPU checks to see that if the new current bin, n, is empty. If it is empty, the Master Control CPU will return to step 610, where it will print a new tray header card and begin to route items into this bin. If the new current bin n is not empty, then the process will return to step 620 where Master Control CPU 140 will check whether the current bin is the last bin, if not it will, at step 622, increase n by one again and check to see if the new current bin is empty. If the current bin is the last bin, then, at step 624, the Master Control CPU 140 will set n to bin 1. At step 626 Master Control CPU 140 again checks if the current bin is empty. If it is, the process returns to step 610. If not, Master Control CPU 140 will continue to loop through steps 620–626 and check if bins are empty until it finds one that is. If all the bins are found to be full, Master Control CPU 140 pauses the collating process until an operator signals that bin 1 has been emptied or replaced. The entire process continues until Master Control CPU 140 determines that no more items remain to be routed. After all items have been routed, items will be in the correct position in Output Bins 158 or, if an item has been routed to Reject Bin Module 146, there will a card marking the correct position in Output Bins 158 of the item. The card will include printed information indicating the missing item which it is replacing. As discussed above, the printed information may include, for example, the position of the missing item in the file in human-readable and computer-readable formats.

Figure 5:
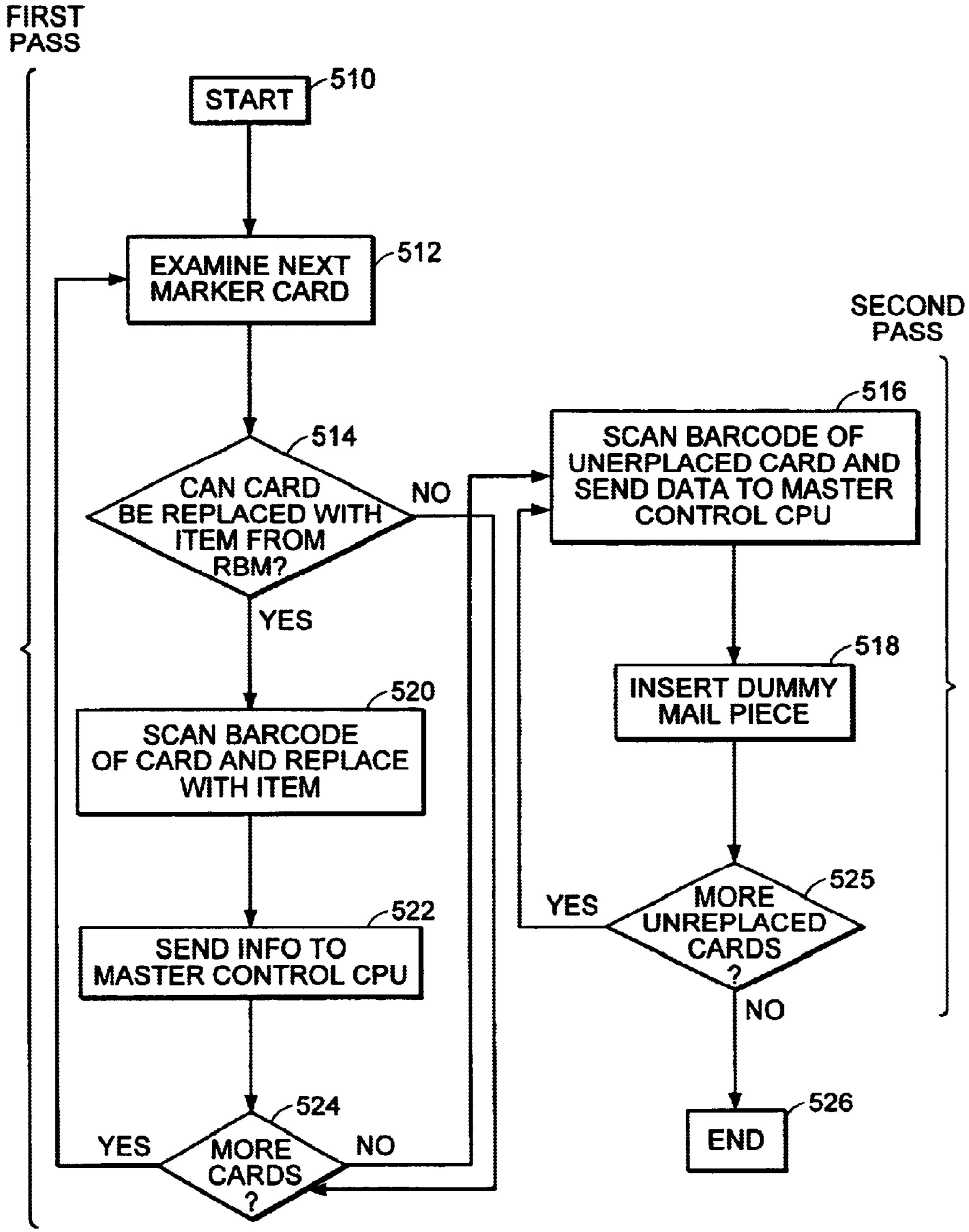
FIG. 5 is a flow chart illustrating a defect resolution process for the merge sequencing system of the present invention.

For an illustrative embodiment shown in FIG. 5, defect resolution is performed as follows. When a bin has been emptied or replaced by an operator, its contents are then ready for defect resolution. Master Control CPU 140 generates a known defect report for each bin, which contains information about items missing from that bin. The defect resolution process begins at step 510 where a first pass is made through each stack of items to attempt to replace each marker card with its corresponding item in RBM 146. At steps 512 and 514, an operator, using the known defect report, then attempts to replace marker cards in the stack of items from the output bin with items in RBM 146. This operation may be performed manually or semi-automatically. For example, the items in the reject bin could be ordered numerically by hand. Then, the items that are already collated could be loaded into a first Feeder Unit, while the items from the Reject Module are loaded into a second Feeder Unit. The items in the first Feeder Unit are then fed to the conveyor until a card is fed. Then, the first item from the second Feeder Unit is fed. The first Feeder Unit continues feeding items, with the second Feeder Unit feeding an item each time the first Feeder Unit feeds a card. Thus, this operation may be performed with minimal work by human operators. Alternatively, human operators may manually go through the stack of items and replace each marker card with a corresponding item from RBM 146. At step 520, if a marker card can be replaced with an item from RBM 146, the item from RBM 146 is then substituted in place of the marker card. At step 522, its barcode or other computer-readable indicia, is read and the information from the indicia is passed to Master Control CPU 140 to inform it that this particular defect has been resolved. At step 516, if a marker card cannot be replaced with an item from RBM

146, the process continues to step 524 where it is determined if there are any more marker cards in the stack of items that have not yet been evaluated for replacement. If more marker cards remain the process returns to step 512 where the next marker card is examined. If no more marker cards remain, the process continues to step 516 where a second pass is made through the stack of items to replace all remaining marker cards with "dummy mail pieces." At step 516 the indicia of a remaining marker cards is read and the information is passed to Master Control CPU 140 to inform it that the item will be replaced with a "dummy mail piece." At step 518, the "dummy mail piece" is inserted in place of the marker card. The "dummy mail piece" may be a standard mail piece that is used to correct all irresolvable errors or it may be a mail piece that is stuffed on the spot with the specific contents intended for the particular addressee. This information can be readily obtained since it is printed on the marker card. At step 525, if no more marker cards remain, the process proceeds to step 526, where the defect resolution process is complete. Otherwise, the process returns to step 516, where the second pass through the stack of items continues until all marker cards have been examined.

Other variations and modifications will occur readily to one skilled in the art and are intended to be within the scope of the invention. For example, Master Control CPU 140 may be designed to control the speed of Conveyor 134, so that an item at a far end of Conveyor 134 may be quickly transported to the opposite end in order to reduce the waiting time for a next item to be fed. Also, the number of Feeder Units and Output Bins and the arrangement of these Feeder Units and Output Bins may be altered. For example, one may place Feeder Units on one side of the conveyor or both sides of the conveyor. Output Bins may be located on the sides of the conveyor instead of the end of the conveyor. Likewise, the positioning of other modules, such as OVM 144, RBM 146, Printer Module 152 and Card Inject Module 150 may be similarly altered.

The invention is not limited by the embodiments described above which are presented as illustrations only, and can be modified and augmented in various ways within the scope of protection defined by the appended patent claims or as contemplated by one of ordinary skilled in the art.

What is claimed is:

1. A method for collating items into at least one ordered group from at least two subgroups using a processor, modules for supplying items and a mechanism for transporting items to an output destination, said method comprising:

(a) arranging the at least two subgroups such that items are in order within each of the at least two subgroups;

(b) placing each of the at least two subgroups into corresponding modules for supplying the items;

(c) controlling a module for a subgroup containing an item of a first ordered group to be supplied to supply the item at a given time to the mechanism for transporting;

(d) repeating act (c) until all items of the first ordered group are collated;

(e) checking the order of the items as they are transported to the output destination; and (f) performing error-correcting routines if an error is detected;

wherein act (a) further comprises subdividing the at least one ordered group into the at least two subgroups such that the items in the at least two subgroup remain ordered relative to the order of the at least one ordered group;

wherein each item bears indicia identifying the position of the item in the at least one ordered group;

further comprising notifying the processor when an out of order item is detected; and wherein act (f) further comprises inserting a placeholder when a missing item is detected.

2. The method of claim 1, further comprising:

(h) repeating steps (c)–(f) for each remaining group of the at least one ordered group.

3. The method of claim 1, wherein subdividing the at least one ordered group into the at least two subgroups comprises choosing a subgroup of the at least two subgroups for each item based upon rules, which rules are unrelated to the order of the items in the at least one ordered group.

4. The method of claim 1, wherein the indicia is a bar code.

5. The method of claim 1, wherein act (e) further comprises checking the indicia on each item.

6. The method of claim 1, wherein act (f) further comprises sending out-of-order items to at least one separate location.

7. The method of claim 1, further comprising placing indicia on the placeholder identifying the position of the missing item in the at least one ordered group.

8. The method of claim 7, wherein the placeholder indicia is printed when the error is detected.

9. The method of claim 7, wherein the placeholder is a card, and wherein at least one physical attribute of the card differs from a corresponding physical attribute of the items.

10. The method of claim 1, wherein the at least two modules are positioned linearly along the mechanism for transporting the items, wherein said mechanism for transporting moves items at a selected speed, and wherein act (c) further comprises utilizing knowledge of a position of the items and the position of the modules to determine the module supplying the next item.

11. The method of claim 10, wherein the act of utilizing knowledge of the position of the items further comprises determining the position of the items using at least one presence detection device.

12. The method of claim 10, wherein the act of utilizing knowledge of the position of the items further comprises determining the position of the items using knowledge of the selected speed of the mechanism for transporting.

13. The method of claim 1, wherein the items are received at the output destination from a stream of items carried by a conveyor.

14. The method of claim 13, wherein the items are stacked into at least one bin at the output destination.

15. The method of claim 14, wherein the items are subdivided into the at least one bin based on their order in the at least one ordered group.

16. An apparatus for collating items into at least one ordered group from at least two subgroups, said apparatus comprising:

a mechanism for transporting the items to an output destination;

at least two modules containing corresponding subgroups for supplying items to the mechanism for transporting the items in response to supply instructions;

a processor for determining the at least one item to be supplied at a given time and generating instructions for a said module to supply the at least one item;

a mechanism for checking the order of items as they are transported to the output destination; and a mechanism for correcting an error detected in the order of items as they are transported to the output destination;

wherein the mechanism for checking the order of the items is adapted to notify the processor when an out of order item is detected; and wherein the mechanism for correcting the error inserts a placeholder if a missing item is detected.

17. The apparatus of claim 16, wherein the mechanism for correcting the error places indicia on the placeholder identifying the position of the missing item in the at least one ordered group.

18. The apparatus of claim 16, wherein the placeholder is a card, and wherein at least one physical attributes of the card differs from a corresponding physical attribute of the items.

19. The apparatus of claim 16, wherein the mechanism for correcting an error sends the out of order item to at least one separate location.

20. The apparatus of claim 16, wherein each item bears indicia identifying the position of the item in the at least one ordered group, and wherein the mechanism for checking the order of the items includes a mechanism checking the indicia on each item.

21. The apparatus of claim 20, wherein the indicia is a bar code, and wherein the mechanism checking the indicia is a bar code reader.

22. The apparatus of claim 16, wherein the at least two modules are positioned linearly along the mechanism for transporting the items, wherein said mechanism for transporting moves items at a selected speed, and wherein the processor utilizes knowledge of the position the items and relative position of the modules in determining the at least one item to be supplied by the said module at the given time.

23. The apparatus of claim 22, further comprising a plurality of presence detection devices for determining the position of the items.

24. The apparatus of claim 22, wherein the processor determines the position of the items based upon the selected speed of the conveyor.

25. The apparatus of claim 16, wherein the items are received at the output destination from a stream of items carried by a conveyor.

26. The apparatus of claim 25, further comprising at least one bin in which the items are stacked at the output destination.

27. The apparatus of claim 26, wherein the items are stacked into the at least one bin based on their order in the at least one ordered group.

28. A method for correcting errors in an apparatus for collating items into an ordered group from at least two subgroups using at least one module for supplying the items and a mechanism for transporting the items to an output destination, wherein each item bears indicia identifying the position of the item in the ordered group, said method comprising:

checking the order of the items as they are transported to the output destination by checking the indicia on each item;

inserting a placeholder when a missing item is detected; and diverting an out-of-order item to a separate location when an out-of-order item is detected.

29. The method of claim 28, further comprising placing indicia on the placeholder identifying the position of the missing item in the ordered group.

30. The method of claim 29, wherein the placeholder is a card, and wherein at least one physical attribute of said card differs from a corresponding physical attribute of the items.

31. An apparatus for correcting errors in an ordered group of items bearing indicia of their position in the ordered group, said apparatus comprising:

a mechanism for transporting the items one by one;

a mechanism for checking the order of the items as they are transported on the mechanism for transporting the items by checking the indicia on the items;

a mechanism for inserting a placeholder when a missing item is detected; and a mechanism for routing an out-of-order item to a separate location when an out-of-order item is detected.

32. The apparatus of claim 31, further comprising a mechanism for placing indicia on the placeholder identifying the position of the missing item in the ordered group.

33. The apparatus of claim 32, wherein the placeholder is a card, and wherein at least one physical attribute of said card differs from a corresponding physical attribute of the items.

* * * * *